(12) United States Patent
Li et al.

(10) Patent No.: US 9,975,289 B2
(45) Date of Patent: May 22, 2018

(54) PEX EXPANDING TOOL

(71) Applicant: Black & Decker Inc., New Britain, CT (US)

(72) Inventors: Qingyang Li, Suzhou (CN); Yuelong Xu, Suzhou (CN); Xiaomei Zheng, Suzhou (CN); Michael P. Kunz, Hampstead, MD (US)

(73) Assignee: Black & Decker Inc., New Britain, CT (US)

( * ) Notice: Subject to any disclaimer, the term of this patent is extended or adjusted under 35 U.S.C. 154(b) by 0 days. days.

(21) Appl. No.: 15/648,893

(22) Filed: Jul. 13, 2017

(65) Prior Publication Data

US 2018/0029286 A1   Feb. 1, 2018

Related U.S. Application Data

(60) Provisional application No. 62/367,262, filed on Jul. 27, 2016.

(51) Int. Cl.
| | |
|---|---|
| *B29C 57/04* | (2006.01) |
| *B29D 23/00* | (2006.01) |
| *B21D 41/02* | (2006.01) |
| *B29K 23/00* | (2006.01) |
| *B29L 23/00* | (2006.01) |
| *B29K 105/00* | (2006.01) |

(52) U.S. Cl.
CPC .......... *B29C 57/045* (2013.01); *B21D 41/028* (2013.01); *B29D 23/001* (2013.01); *B29K 2023/0691* (2013.01); *B29K 2105/258* (2013.01); *B29L 2023/22* (2013.01)

(58) Field of Classification Search
CPC ..... B29C 57/04; B29C 57/045; B21D 41/028; B21D 39/20; B29D 23/001
USPC ......................................................... 72/393
See application file for complete search history.

(56) References Cited

U.S. PATENT DOCUMENTS

| | | | |
|---|---|---|---|
| 1,403,120 A | 1/1922 | Kruse | |
| 2,161,963 A | 6/1939 | Khatuneff | |
| 2,211,741 A | 8/1940 | Elwell | |

(Continued)

FOREIGN PATENT DOCUMENTS

| | | |
|---|---|---|
| CA | 2283664 A1 | 9/1998 |
| CA | 2230124 C | 3/2007 |

(Continued)

OTHER PUBLICATIONS

EP search report dated Sep. 13, 2017, for EP Application No. 17182163.

*Primary Examiner* — David B Jones
(74) *Attorney, Agent, or Firm* — Adan Ayala

(57) ABSTRACT

A tool operable to expand an end of a pipe, such as PEX pipe, has a jaw assembly with jaws movable between a closed position and an expanded position and rotatable about a longitudinal axis. A motor drives an output spindle driven by the motor, which in turn drives a radial cam. A wedge is movable by the radial cam in a reciprocating motion along the axis, causing the wedge to move between a first position where the jaws are in the closed position and a second position where the jaws are in the expanded position. A rotating ring is mounted on the wedge and connected to the jaws. The rotating ring is driven by the output spindle for rotating the jaws about the axis.

16 Claims, 3 Drawing Sheets

(56) References Cited

U.S. PATENT DOCUMENTS

| | | |
|---|---|---|
| 2,542,305 A | 2/1951 | Brinen et al. |
| 3,449,967 A | 7/1967 | Dancsik |
| 3,857,666 A | 12/1974 | Barnett |
| 3,888,102 A | 6/1975 | Nigido |
| 4,107,249 A | 8/1978 | Murai et al. |
| 4,494,398 A | 1/1985 | Svoboda |
| 4,541,266 A | 9/1985 | Totsu |
| 5,090,226 A | 2/1992 | Takeoka et al. |
| 5,511,912 A | 4/1996 | Ellerbock |
| 5,744,085 A | 4/1998 | Soerberg |
| 6,415,641 B1 | 7/2002 | Wagner |
| 6,672,128 B2 | 1/2004 | Wagner et al. |
| 7,018,195 B2 | 3/2006 | Stone |
| 7,128,560 B2 | 10/2006 | Tandart |
| 7,922,475 B2 | 4/2011 | Guelt |
| 8,517,715 B2 | 8/2013 | Thorson et al. |
| 8,763,439 B2 | 7/2014 | Thorson et al. |
| 8,938,886 B2 | 1/2015 | Ross et al. |
| 9,248,617 B2 * | 2/2016 | Lundequist ............ B21D 39/20 |
| 9,555,577 B2 * | 1/2017 | Greding ................ B29C 57/04 |
| 2006/0201228 A1 | 9/2006 | Rothenberger |
| 2010/0308503 A1 | 12/2010 | Schramm et al. |
| 2012/0181727 A1 | 7/2012 | Linder et al. |
| 2012/0217674 A1 | 8/2012 | Greding |
| 2013/0156496 A1 | 6/2013 | Greding et al. |
| 2013/0192331 A1 | 8/2013 | Ross et al. |
| 2015/0114068 A1 | 4/2015 | Hasenberg et al. |
| 2015/0258598 A1 | 9/2015 | Frenken |
| 2015/0367556 A1 | 12/2015 | Ellice |

FOREIGN PATENT DOCUMENTS

| | | |
|---|---|---|
| DE | 202012104763 U1 | 3/2014 |
| DE | 102012109255 A1 | 4/2014 |
| DE | 102013107294 A1 | 1/2015 |
| EP | 0252868 A2 | 3/1987 |
| EP | 1407838 A2 | 4/2004 |
| EP | 2374554 A1 | 10/2011 |
| WO | WO2999000966 | 12/2008 |
| WO | 2012022665 A1 | 2/2012 |
| WO | 2013122732 A1 | 8/2013 |
| WO | 2014125025 A1 | 8/2014 |

* cited by examiner

PEX EXPANDING TOOL

CROSS-REFERENCE TO RELATED PATENT APPLICATIONS

The present application derives priority from U.S. Application No. 62/367,262, filed on Jul. 27, 2016, entitled PEX EXPANDING TOOL, and which is hereby incorporated by reference.

FIELD

The present invention relates to pipe and tubing expansion tools and methods. More particularly, the present invention relates to PEX (cross-linked polyethylene) expansion tools that utilize a multi-segment expansion head, and an auto-rotation feature.

BACKGROUND

Polymer tubing is gaining popularity in residential home and commercial building construction due to the rising cost of copper pipe. One of the more common types of polymer tubing is made from cross-linked polyethylene, commonly known as PEX. Polymer tubing is connected to a joint by expanding the mouth of the tubing, thus allowing the tubing to slip over the joint. The tubing is then secured to the joint by crimping the expanded part of the tubing. A typical building will have many joints; hence installation of the tubing involves expanding the mouths of numerous tubes.

DESCRIPTION OF THE DRAWINGS

Preferred embodiments of the invention will now be described, by way of example, with reference to the accompanying drawings, of which:

FIGS. 6A-6B are perspective and cross-sectional views thereof, respectively.

DETAILED DESCRIPTION

Figure 2:
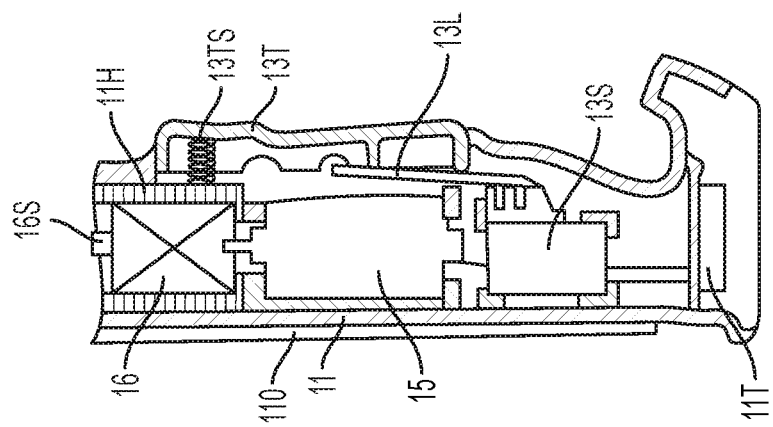
FIG. 2 is a partial cross-sectional view from the left side.
Figure 1:
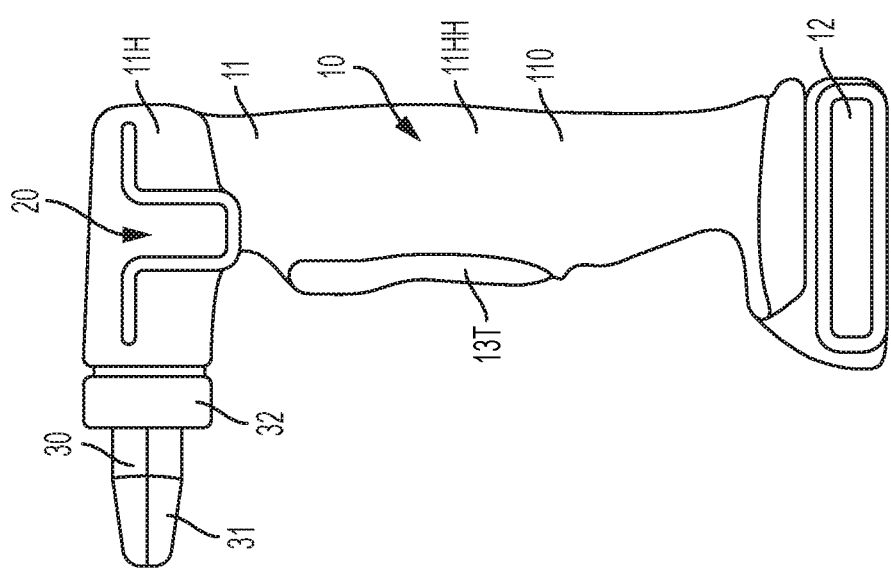
FIG. 1 is a right side view of the tool according to the invention.
Figure 3A:
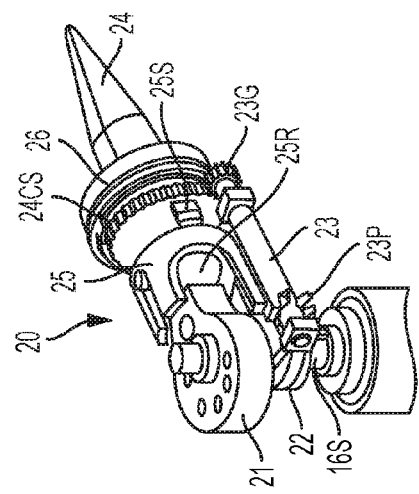
FIGS. 3A-3C are partial perspective views of the jaws rotating/expanding mechanism.
Figure 3B:
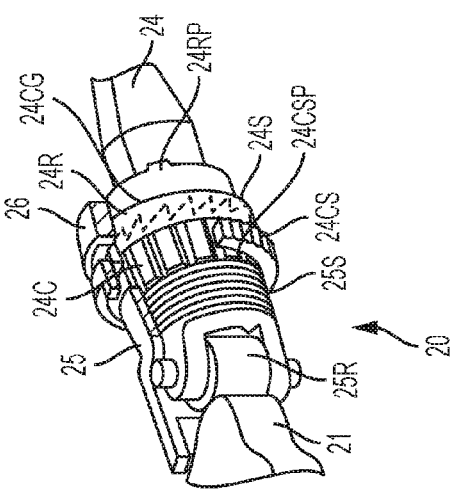
Figure 3C:
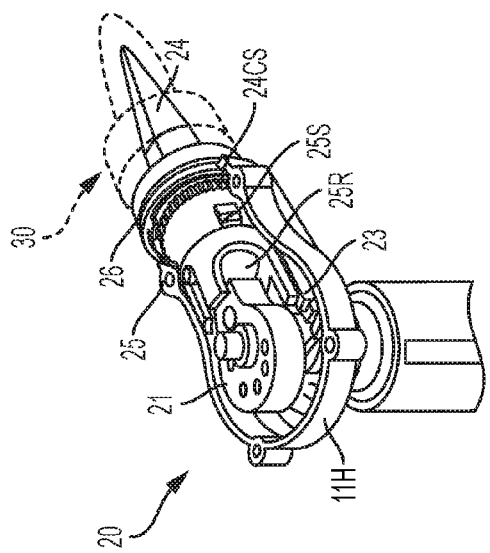
Figure 5:
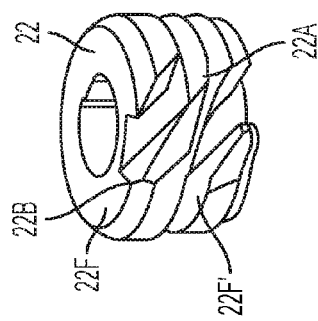
FIG. 5 is a front perspective view of an index cam used in the jaws rotating/expanding mechanism of FIGS. 3A-3C.

Referring now to the drawings, an expanding tool 10 includes a housing 11 preferably including a handle 11HH, a jaw assembly 30 disposed on housing 11, a jaws rotating/expanding mechanism 20 disposed within housing 11, and a motor 15 for driving jaws rotating/expanding mechanism 20. A power tool battery pack 12 may be attached to housing 11 and electrically connected to tool 10 in order to power motor 15.

Housing 11 may be made of a high-impact plastic, such as polybutylene terephthalate (PBT). Housing 11 may be overmolded with a rubber-like material 11O for better grip.

Housing 11 may also include a housing portion 11H for at least partially encasing jaws rotating/expanding mechanism 20. Housing portion 11H is preferably made of metal, such as aluminum or magnesium.

For details on power tool battery pack 12, persons skilled in the art are referred to U.S. Pat. Nos. 6,996,909 and 7,661,486, which are fully incorporated herein by reference. Power tool battery pack 12 is preferably electrically connected to tool terminals 11T, and in turn to switch 13S.

Switch 13S may be activated by a trigger 13T, which is movable relative to housing 11. The motion of trigger 13T is transferred to activate switch 13S via a link 13L. A spring 13TS preferably biases trigger 13T away from housing 11.

Upon activation of switch 13S, power from power tool battery pack 12 is transferred to motor 15. Motor 15 preferably drives a four-stage planetary gear transmission 16, which has an output spindle 16S.

Referring to FIGS. 3A-5, jaws rotating/expanding mechanism 20 may include a radial cam 21 and an index cam 22. Preferably radial cam 21 and index cam 22 are keyed and/or fixedly attached to output spindle 16S, so that radial cam 21 and index cam 22 rotate together with output spindle 16S. Index cam 22 engages protrusions 23P on shaft 23. Shaft 23 may carry a gear 23G at one end. Preferably shaft 23 rotates about an axis substantially perpendicular to the axis of output spindle 16S.

Jaws rotating/expanding mechanism 20 may also include a wedge 24, which preferably moves in a reciprocating motion. Wedge 24 may be connected to a sleeve 25. Sleeve 25 may slidingly support a roller assembly 25R, which contacts radial cam 21. A spring 25S may abut an end of wedge 24 and roller assembly 25R, thus biasing roller assembly 25 towards radial cam 21.

A clutch ring 24C and a rotation ring 24R are preferably mounted on and around wedge 24. Preferably wedge 24, clutch ring 24C and rotation ring 24R are substantially coaxial. Clutch ring 24C and rotation ring 24R preferably have sawtooth-shaped teeth 24S that engage each other, so that clutch ring 24C and rotation ring 24R can rotate together about wedge 24. Clutch ring 24C and rotation ring 24R may also slide along wedge 24.

Clutch ring 24C may have axial grooves 24CG. Such grooves 24CG may be engaged by protrusion(s) 24CSP of a gear ring 24CS. Persons skilled in the art will note that the axial position of gear ring 24CS is preferably fixed in order to maintain contact with gear 23G. By having protrusion(s) 24CSP engage grooves 24CG, gear ring 24CS will preferably rotate together clutch ring 24C, while allowing clutch ring 24C to separately move along its axis.

Persons skilled in the art will recognize that, if rotation ring 24R were to jam or stall and no longer rotate, if protrusions 24CSP force clutch ring 24C to rotate, the sawtooth-shaped teeth 24S of clutch ring 24C will ride along the sawtooth-shaped teeth 24S of rotation ring 24R, separating clutch ring 24C from rotation ring 24R. After a tooth 24S of clutch ring 24C has cleared the corresponding tooth 24S of rotation ring 24R, spring 25S pushes clutch 24C towards rotation ring 24R, allowing clutch ring 24C to continue to rotate and ride along the sawtooth-shaped teeth 24S without damaging the different components of jaws rotating/expanding mechanism 20.

A collar 26 captures clutch ring 24C, rotation ring 24R and wedge 24.

Figure 6B:
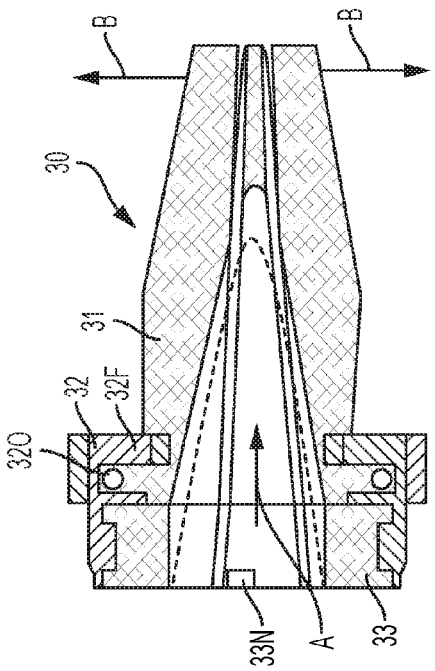
FIGS. 6A-6B show a jaw assembly to be rotated and expanded by the jaws rotating/expanding mechanism of FIGS. 3A-3C, where
Figure 4:
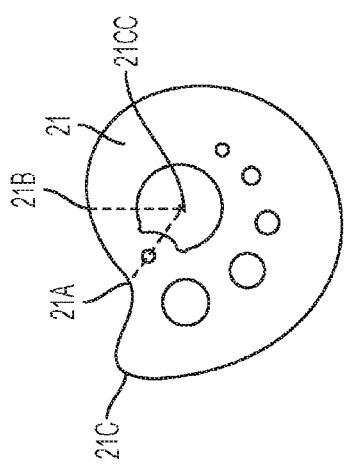
FIG. 4 is a top view of a radial cam used in the jaws rotating/expanding mechanism of FIGS. 3A-3C.
Figure 6A:
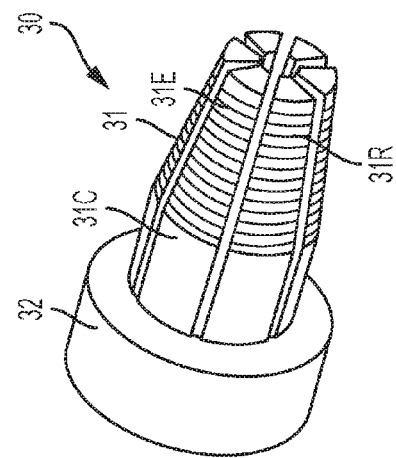

Referring to FIGS. 6A-6B, jaw assembly 30 preferably engages rotation ring 24R and/or collar 26, in a manner similar to that described in U.S. Pat. Nos. 8,517,715 and 8,763,439, which are fully incorporated herein by reference. Jaw assembly 30 includes a plurality of (preferably six) jaws 31, which is captured within a cap 32. Preferably jaws 31 are captured by a flange 32F of cap 32. Persons skilled in the art will recognize that jaws 31 can slide along flange 32F when wedge 24 moves along direction A so that jaws 31 can move away from the axis of wedge 24 along direction B. A resilient O-ring 320 is preferably disposed around all jaws 31 so that, when wedge 24 moves in a direction opposite to direction A, jaws 31 will move towards the axis of wedge 24 in a direction opposite to direction B.

Each jaw 31 preferably includes a frustoconical end 31E that preferably extends from a cylindrical portion 31C. Preferably ribs 31R are formed on the frustoconical ends 31E. However other constructions may omit the ribs 31R. In the illustrated construction, two or more jaws 24 are used to define a complete 360 degree jaw section that fits within a PEX tube to be expanded.

Cap 32 can be engaged to housing 11H and/or collar 26. Preferably cap 32 is threadingly engaged to collar 26.

Each jaw 31 preferably includes a second end 33. Each end 33 preferably has at least one notch 33N that engages a corresponding protrusion 24RP on rotating ring 24R.

With such arrangement, when the output spindle 16S drives the index cam 22 to rotate, protrusion 23P of shaft 23 contacts the surface at point 22A of index cam 22. At the same time roller 25R contacts the surface at point 21A of radial cam 21. As index cam 22 continues to rotate so that protrusion 23P moves along the surface towards point 22B of index cam 22, radial cam 21 will also rotate so that roller 25R moves along the surface towards point 21B of radial cam 21.

As index cam 22 rotates therealong, shaft 23 also rotates, causing gear 23G (and thus gear ring 24CS) to rotate. The rotation of gear ring 24CS causes clutch ring 24C and rotating ring 24R to rotate. The rotation of rotating ring 24R causes in turn the rotation of jaws 31.

As index cam 22 rotates further, protrusion 23P will move along a flat surface 22F of index cam 22. Therefore shaft 23 will not rotate any further. Therefore, gear 23G, gear ring 24CS, clutch ring 24C, rotating ring 24R, collar ring 33 and jaws 31 will not rotate either.

At the same time protrusion 23P is moving along flat surface 22F, roller 25R is moving along the surface of radial cam 21. Preferably a second protrusion 23P will also move along a second flat surface 22F'. While the distance between the center 21CC and point 21A is the same as the distance between the center 21CC and point 21B, the distance between the center 21CC and a point in the cam surface will keep increasing until roller 25R contacts point 21C. Such increasing distance will cause roller 25R (and thus wedge 24) to move towards jaws 31, causing them to expand along direction B (as shown in FIG. 6B).

As radial cam 21 continues to rotate past point 21C towards point 21A, spring 25S pushes roller 25R into contact with radial cam 21 and pulls wedge 24 therealong towards radial cam 21. This allows O-ring 320 to pull jaws 31 towards the position shown in FIGS. 6A-6B.

It will be understood that the above description and the drawings are examples of particular implementations of the invention, but that other implementations of the invention are included in the scope of the claims.

What is claimed is:

1. A tool operable to expand an end of a pipe, the tool comprising:
    a housing;
    a jaw assembly disposed on the housing, the jaw assembly comprising a plurality of jaws rotatable about an axis and movable between a closed position where portions of the plurality of jaws are adjacent to the axis, and an expanded position where the portions are moved away from the axis;
    a motor disposed in the housing;
    an output spindle driven by the motor;
    a radial cam connected to the output spindle;
    a wedge movable by the radial cam in a reciprocating motion along the axis;
    an index cam connected to the output spindle;
    a shaft connected to the index cam;
    a rotating ring mounted on the wedge;
    a clutch ring mounted on the wedge and engaging the rotating ring; and
    a gear ring driven by the shaft and slidably engaging the clutch ring;
    wherein the wedge is movable between a first position where the plurality of jaws are in the closed position and a second position where the plurality of jaws are in the expanded position.

2. The tool of claim 1, wherein the plurality of jaws is rotated when the shaft rotates.

3. The tool of claim 1 wherein the clutch ring cap momentarily disengage from the rotating ring.

4. The tool of claim 3, wherein the clutch ring has teeth, and the rotating ring has teeth meshing with the teeth of the clutch ring.

5. The tool of claim 4, wherein the teeth of the clutch ring can momentarily disengage from the teeth of the rotating ring.

6. The tool of claim 1, further comprising a sleeve connected to the wedge and contacting the radial cam.

7. The tool of claim 1, further comprising a power tool battery pack releasably connected to the housing and electrically connected to the motor.

8. A tool operable to expand an end of a pipe, the tool comprising:
    a housing;
    a jaw assembly disposed on the housing, the jaw assembly comprising a plurality of jaws rotatable about an axis and movable between a closed position where portions of the plurality of jaws are adjacent to the axis and an expanded position where the portions are moved away from the axis;
    a motor disposed in the housing;
    an output spindle driven by the motor;
    a radial cam connected to the output spindle;
    a wedge movable by the radial cam in a reciprocating motion along the axis, the wedge being movable between a first position where the plurality of jaws are in the closed position and a second position where the plurality of jaws are in the expanded position; and
    a rotating ring mounted on the wedge and connected to the plurality of jaws, the rotating ring being operatively connected to and driven by the output spindle for rotating the plurality of jaws about the axis.

9. The tool of claim 8, further comprising a shaft connected to the output spindle and driving the rotating ring.

10. The tool of claim 9, wherein the shaft is connected to the output spindle by an index cam.

11. The tool of claim 9, further comprising:
    a clutch ring mounted on the wedge and engaging the rotating ring; and
    a gear ring driven by the shaft and slidably engaging the clutch ring.

12. The tool of claim 11 wherein the clutch ring can momentarily disengage from the rotating ring.

13. The tool of claim 12, wherein the clutch ring has teeth, and the rotating ring has teeth meshing with the teeth of the clutch ring.

14. The tool of claim 13, wherein the teeth of the clutch ring can momentarily disengage from the teeth of the rotating ring.

15. The tool of claim 8, further comprising a sleeve connected to the wedge, the sleeve contacting the radial cam.

16. The tool of claim 8, further comprising a power tool battery pack releasably connected to the housing and electrically connected to the motor.

* * * * *